(12) United States Patent
Vrbaski et al.

(10) Patent No.: US 9,906,887 B2
(45) Date of Patent: Feb. 27, 2018

(54) PCRN HOME NETWORK IDENTITY

(75) Inventors: Mira Vrbaski, Nepean (CA); Lui Chu Yeung, Kanata (CA); Robert A. Mann, Carp (CA); Sachin J. Lalseta, Ottawa (CA); Haiqing Ma, Nepean (CA); Partoo Mohebi-Sarmadi, Ottawa (CA); Kalyan Premchand Siddam, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1419 days.

(21) Appl. No.: 13/275,762

(22) Filed: Oct. 18, 2011

(65) Prior Publication Data

US 2013/0094405 A1    Apr. 18, 2013

(51) Int. Cl.
  *H04W 4/22*    (2009.01)
  *H04W 4/00*    (2018.01)

(52) U.S. Cl.
  CPC .............. *H04W 4/00* (2013.01); *H04W 4/22* (2013.01)

(58) Field of Classification Search
  CPC .......... H04W 4/00; H04W 60/00; H04W 4/22
  USPC ................................. 370/259, 260
  See application file for complete search history.

(56) References Cited

U.S. PATENT DOCUMENTS

| | | | | |
|---|---|---|---|---|
| 5,457,680 A | * | 10/1995 | Kamm et al. | 370/332 |
| 8,369,827 B2 | * | 2/2013 | Cutler et al. | 455/405 |
| 2006/0080486 A1 | * | 4/2006 | Yan | 710/123 |
| 2007/0060097 A1 | * | 3/2007 | Edge et al. | 455/404.1 |
| 2011/0103266 A1 | * | 5/2011 | Andreasen et al. | 370/259 |
| 2012/0083240 A1 | * | 4/2012 | Patel | 455/404.2 |
| 2012/0284775 A1 | * | 11/2012 | Betti et al. | 726/3 |

\* cited by examiner

*Primary Examiner* — Noel Beharry
*Assistant Examiner* — Pamit Kaur
(74) *Attorney, Agent, or Firm* — Kramer & Amado, P.C.

(57) ABSTRACT

Various exemplary embodiments relate to a method of determining by a network node whether a session establishment request is for a subscriber of a home network. The method may include: defining a home network identity including a network identifier and an emergency access point name (APN); receiving a session establishment request; comparing a called station ID of the session establishment request with the emergency APN; comparing a subscription ID of the session establishment request with the network identifier; and if either the called station ID matches an emergency APN or the subscription ID matches a network identifier: determining that the subscriber is a subscriber of the home network, and fulfilling the session establishment request. Various exemplary embodiments relate to a system for determining the home network of a subscriber. The system may include a policy and charging rules node (PCRN) configured to process a session establishment request.

15 Claims, 7 Drawing Sheets

PCRN HOME NETWORK IDENTITY

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

The 3GPP also describes the communications between a home public land mobile network (HPLMN) and a visited public land mobile network (VPLMN) when a subscriber roams onto the network of another service provider. 3GPP TS 29.215 describes the interactions between a VPLMN and HPLMN.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of determining by a network node whether a session establishment request is for a subscriber of a home network. The method may include: defining a home network identity including at least one network identifier used by the home network and at least one emergency access point name (APN); receiving a session establishment request; comparing a called station ID of the session establishment request with the at least one emergency APN of the home network identity; comparing a subscription ID of the session establishment request with the at least one network identifier; and if either the called station ID matches an emergency APN or the subscription ID matches a network identifier: determining that the subscriber is a subscriber of the home network, and fulfilling the session establishment request.

In various alternative embodiments, the at least one network identifier may be a combination of a mobile country code (MCC) and mobile network code (MNC) and the step of comparing a subscription ID may include comparing the first five or six digits of an international mobile subscriber identifier (IMSI) with the combination of MCC and MNC.

In various alternative embodiments, the at least one network identifier may be a domain name and the step of comparing a subscription ID may include comparing the domain name of a network access identifier (NAI) with the domain name of the home network identity.

In various alternative embodiments, the step of fulfilling the session establishment request may include: determining an instance of the PCRN that should process the session establishment request; and forwarding the session establishment request to the instance of the PCRN.

In various alternative embodiments, the method further includes: if the called station ID does not match an emergency APN and the subscription ID does not match a network identifier: determining whether the subscriber is a roaming subscriber on the home network, and if the subscriber is a roaming subscriber, forwarding the session establishment request to a PCRN of roaming partner.

In various alternative embodiments, the session establishment request is received from the PCRN of a roaming partner via an S9 interface. In various alternative embodiments, the session establishment request is received from a policy charging and enforcement node (PCEN).

Various exemplary embodiments may relate to the above described methods encoded as instructions on a non-transitory machine-readable medium. The non-transitory machine-readable medium may include instructions that if executed by a processor of a network node perform the above described method.

Various exemplary embodiments relate to a system for determining the home network of a subscriber. The system may include a policy and charging rules node (PCRN) configured to process a session establishment request. The PCRN may include a home network identity storage including at least one network identifier and at least one emergency access point name (APN); an interface configured to receive a message requesting service for a subscriber; and a home subscriber manager configured to determine that the message is to be processed locally if a subscription identifier of the message matches the at least one network identifier or a called station identifier of the message matches the at least one emergency APN.

In various alternative embodiments, the system may also include a Diameter proxy agent configured to receive a session establishment request and determine whether a subscriber associated with the session establishment request is a subscriber of the home network and configured to forward the session establishment request to the PCRN. The Diameter proxy agent may be further configured to choose the PCRN based on the home network identity storage of the PCRN including a network identifier or an APN included in the session establishment request.

In various alternative embodiments, the system may further include a partner PCRN configured to send a session establishment request via an S9 interface, wherein the PCRN is configured to receive the session establishment request from the partner PCRN via the S9 interface.

In various alternative embodiments, the PCRN further includes a roaming manager configured to determine that the message is associated with a roaming subscriber if the subscription identifier matches a network identifier of a roaming partner profile.

It should be apparent that, in this manner, various exemplary embodiments enable a network node to identify subscribers of the network. In particular, by providing a configurable home network identity at a network node, the network node may identify subscribers to the network based on various subscription identifiers.

BRIEF DESCRIPTION OF THE DRAWINGS

In order to better understand various exemplary embodiments, reference is made to the accompanying drawings, wherein.

DETAILED DESCRIPTION

Figure 1:
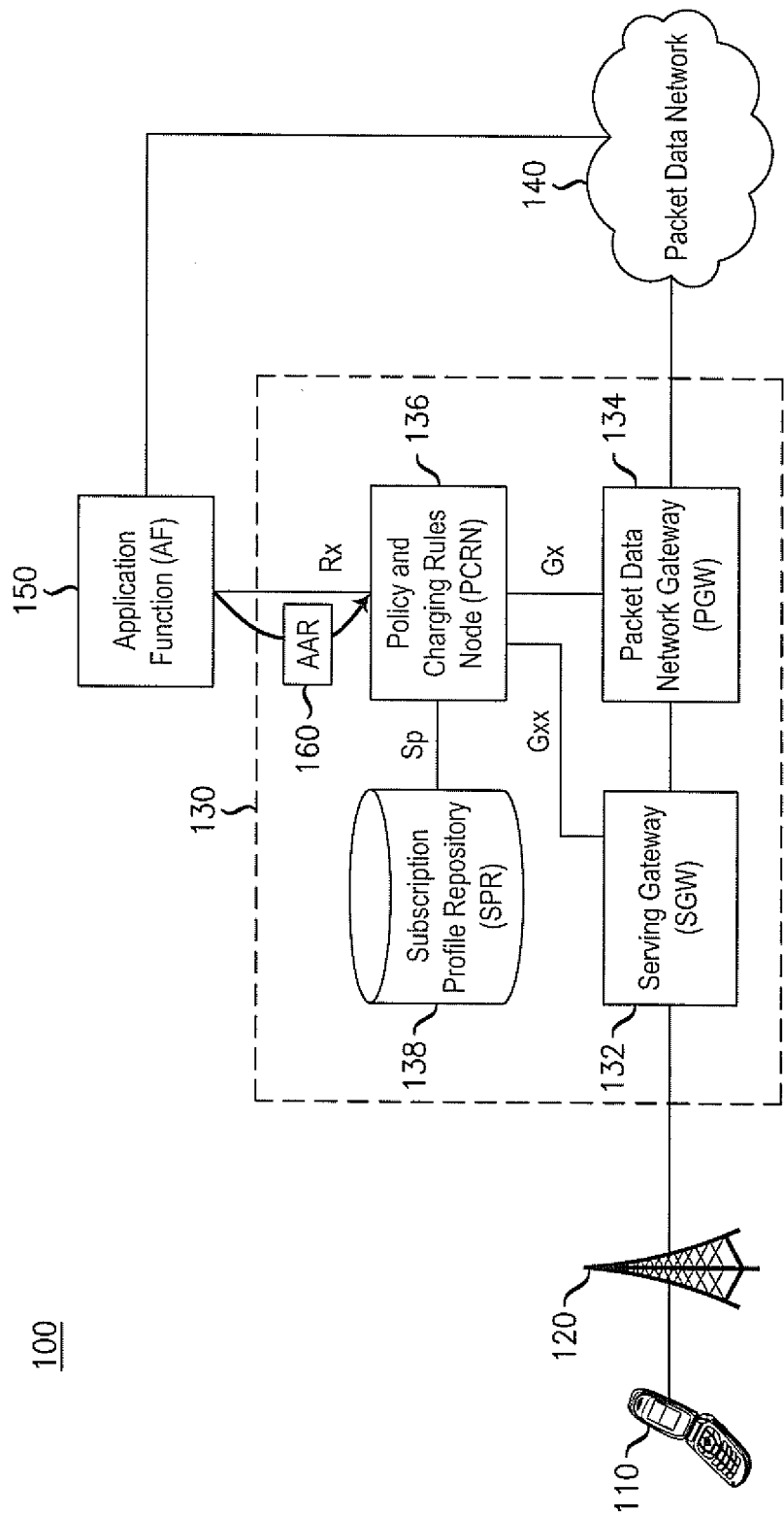
FIG. 1 illustrates an exemplary subscriber network.

In a network that may receive service requests from both home network subscribers and roaming subscribers, a network node must be able to identify requests from home network subscribers. A network node must also be able to process emergency requests. These tasks can become difficult if a service provider has a large network or uses non-3GPP technology. For example, the 3GPP specifications suggest using an international mobile subscriber identity (IMSI) including a Mobile Country Code (MCC) and Mobile Network Code (MNC) to identify the home public land mobile network (HPLMN) of the subscribers. A service provider, particularly large service providers, may use multiple MNCs and even multiple MCCs. Therefore, a network node may recognize multiple MCC/MNC combinations as home network subscribers. Similarly, a network using CDMA technology may use a network access identifier (NAI) including a domain name to identify subscribers. Therefore, a network node may also recognize multiple domain names as HPLMN subscribers. Finally, in order to process emergency requests efficiently, a network may treat any request arriving from an emergency access point (APN) as a home network subscriber.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. In various embodiments, subscriber network 100 may be a public land mobile network (PLMN). Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR 160, upon receipt of a CCR, PCRN may generate at least one new PCC rule for fulfilling the application request. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

Figure 2:
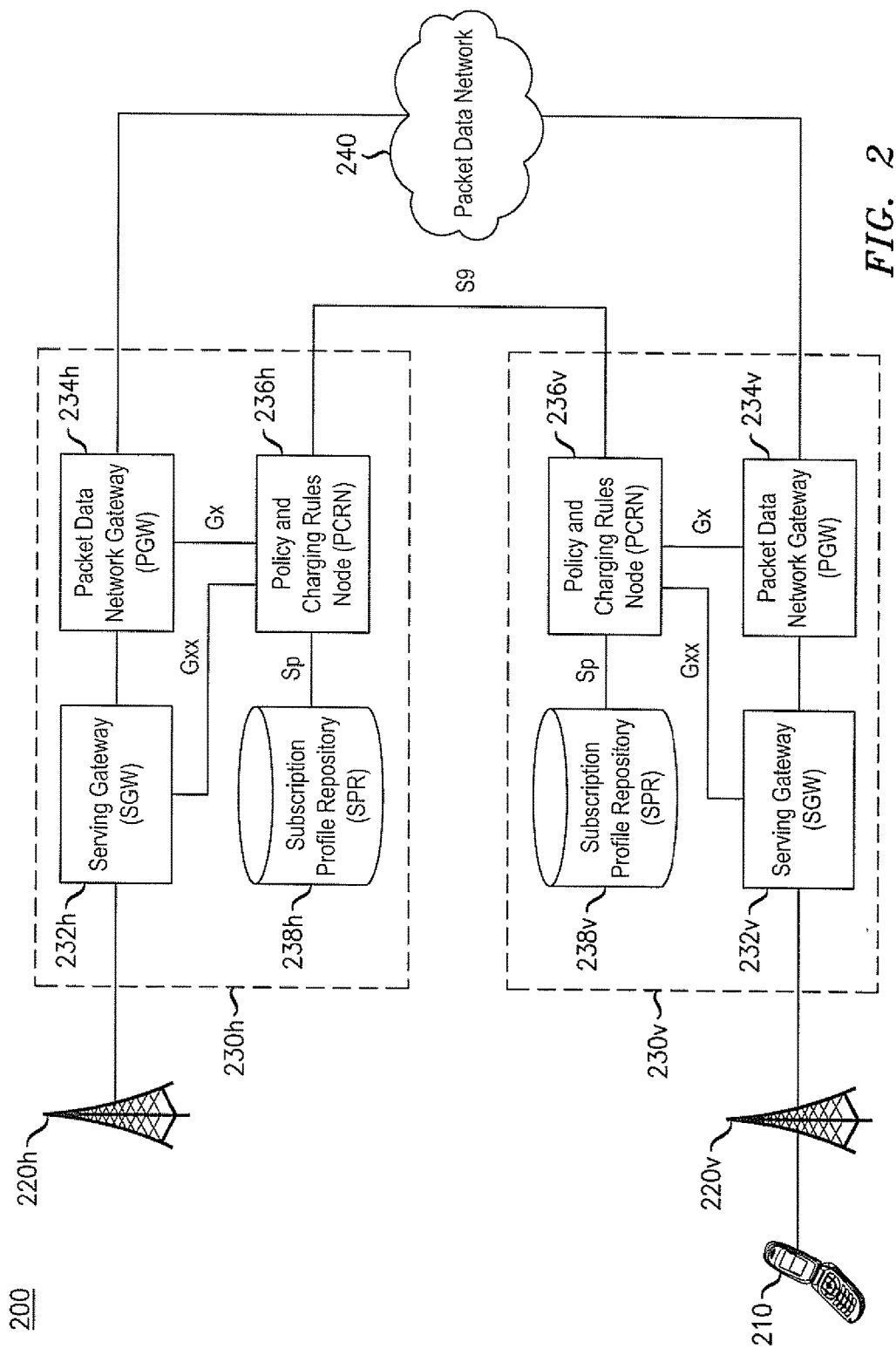
FIG. 2 illustrates an exemplary subscriber network for providing roaming access to various data services.

FIG. 2 illustrates an exemplary subscriber network 200 for providing roaming access to various data services. Exemplary subscriber network 200 may correspond to exemplary network 100. EPC 230*v* may provide visited access to packet data network 240 for roaming UEs such as UE 210, whereby traffic associated with UE 210 flows through SGW 232*v* and PGW 234*v*. In various embodiments, EPC 230*v* and EPC 230*h* may connect to the same packet data network 240 (as shown) or may connect to two independent networks (not shown). Alternatively or additionally, EPC 230*v* may provide home-routed access to packet data network 240 for roaming UEs such as UE 210, whereby traffic associated with UE 210 flows through SGW 232*v* and PGW 234*h*. Accordingly, SGW 232*v* may be in communication with PGW 234*h*. Likewise, SGW 232*h* may be in communication with PGW 234*v*, such that EPC 230*h* may provide similar access to other roaming UEs (not shown) attached to base station 220*h*.

UE 210 may be in communication with a base station 220*v* but outside the range of base station 220*h*. Base station 220*v*, however, may not connect to a home public land mobile network (HPLMN) for the UE 210. Instead, base station 220*v* may belong to a visited public land mobile network (VPLMN) of the UE 210 and, as such, may not have access to various data associated with the UE 210, a subscriber associated therewith, and/or other data useful or necessary in providing connectivity to UE 210. For example, SPR 238*v* may not include information associated with UE 210; instead, such information may be stored in SPR 238*h*. To enable the provision of service based on subscriber information stored in SPR 238*h*, PCRN 236*v* may communicate with PCRN 236*h* via an S9 session.

In various embodiments, PCRN 236*v* may forward requests associated with UE 210 to PCRN 236*h* via an S9 session. PCRN 236*h* may process these messages to, for example, generate PCC and/or QoS rules. PCRN 236*h* may then forward these rules to PCRN 236*v* for installation on PGW 234*v* and/or SGW 232*v*. In the case of home-routed access, PCRN 236*h* may also install PCC rules directly on PGW 234*h*. In view of the cooperative nature of PCRNs 236*h*, 236*v*, these devices may be referred to as "partner devices" with respect to each other.

In various embodiments, each partner device may be capable of operating as a home device and a visited device. For example, if another roaming UE (not shown) were attached to base station 220*h*, PCRN 236*h* may be additionally capable of forwarding requests to PCRN 236*v* and PCRN 236*v* may be capable of returning appropriate rules to PCRN 236*h* for installation.

Figure 3:
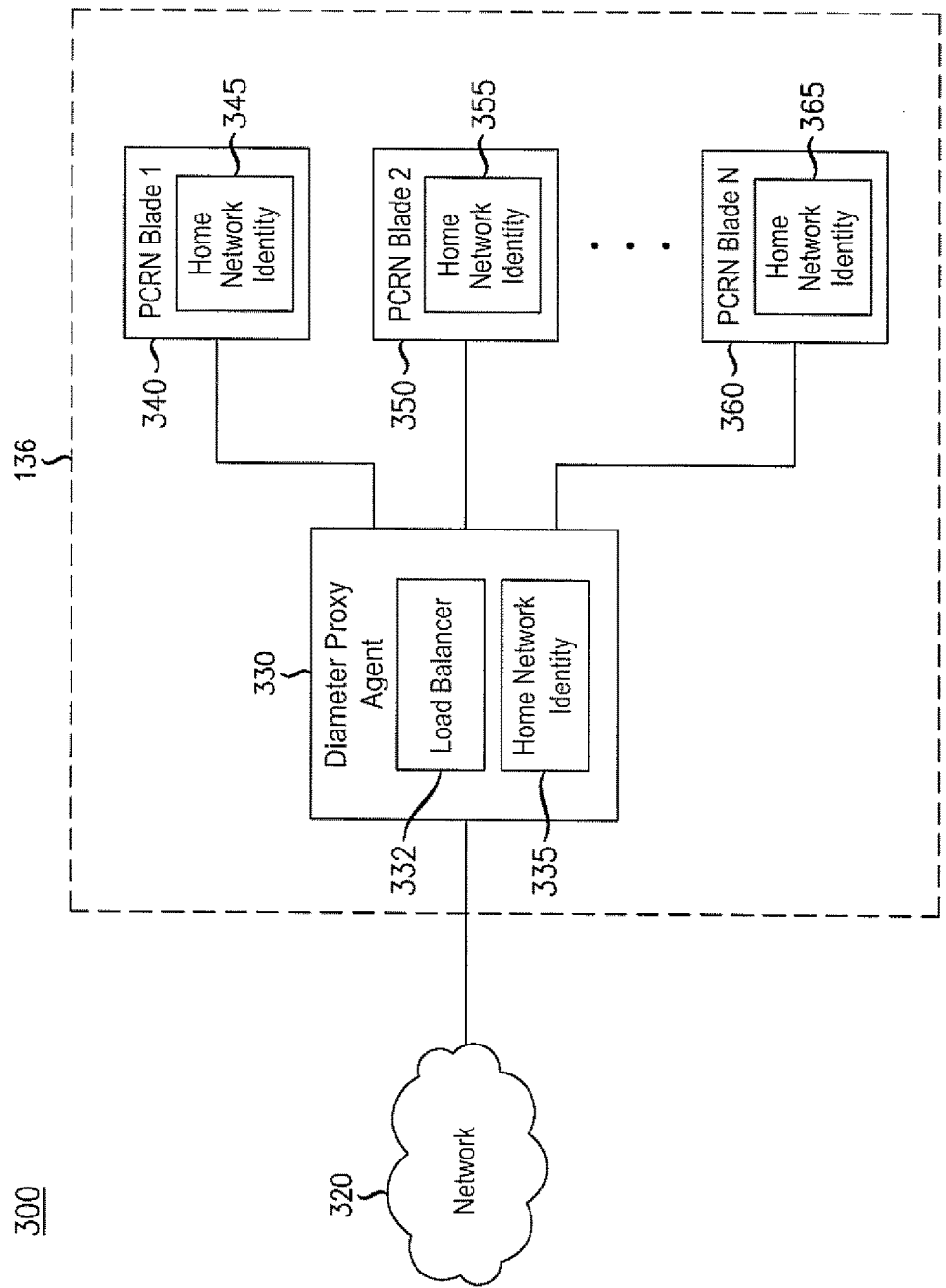
FIG. 3 illustrates an alternative view of the subscriber network.

FIG. 3 illustrates an alternative view 300 of the subscriber network 100 including an expanded view of a PCRN such as PCRN 136 of FIG. 1 or PCRN 236*v* and PCRN 236*h* of FIG. 2. As shown in alternative view 300, exemplary subscriber network 100 may be represented as a network 320 and a policy and charging rules node (PCRN) 136. Network 320 may correspond to one or more devices of exemplary network 100 such as, for example, user equipment 110, PGW 134, and/or AF 150.

To provide scalability and increased processing capacity, PCRN 136 may be organized as a number of separate PCRN blades 340, 350, 360 that communicate with network 310 via a diameter proxy agent (DPA) 330. As such, DPA 330 may act as a message router between network 310 and PCRN blades 340, 350, 360. In various embodiments, DPA 330 may be disposed within the same chassis as PCRN blades 340, 350, 360.

DPA 330 may include a device or group of devices adapted to receive various messages from network 320. For each received message, DPA 330 may identify an appropriate PCRN blade 340, 350, 360 to process the message. In various embodiments, DPA 330 may also forward messages received from PCRN Blades 340, 350, 360 to appropriate elements of network 320. In various embodiments, DPA 330 may also directly identify the IP-CAN session and/or subscriber associated with the message or may indirectly identify such entities by inserting additional identifying information into the message. DPA 330 may include home network identity module 335 and load balancer 338.

Home network identity module 335 may determine whether a received message corresponds to a subscriber to the home network. Home network identity module 335 may include any requests from an emergency access point name (APN) as subscribers to the home network. If a request is not from an emergency APN, home network identity module 335 may determine whether a subscription identifier included within the request corresponds to an identifier of the home network. For example, home network identity module 335 may extract a combination of Mobile Country Code (MCC) and Mobile Network Code (MNC) from an international mobile subscriber identity (IMSI). The MCC/MNC combination may be compared to MCC/MNC combinations used by the network. As another example, if the subscriber identifier is a network access identifier (NAI), home network identity module 335 may compare the domain name of the NAI with a set of domain names used by the network. DPA 330 may determine which PCRN blade 340, 350, 360 processes the message based on the network identifier corresponding to the subscription identifier.

Load balancer 338 may determine to which PCRN blade 340, 350, 360 to route a message. For example, in various embodiments, each network identifier used by the network may be associated with one PCRN blade 340, 350, 360. In such embodiments, load balancer 338 may use information carried by the message to identify a network identifier, for example an MCC/MNC combination or NAI domain, associated with the message. Load balancer 338 may determine which blade will process the message based on the network identifier. Load balancer 338 may route messages not associated with the home network, that is, requests for roaming subscribers, to a different blade. Finally, DPA 330 may forward the message to the associated PCRN blade 340. In various alternative embodiments, load balancer 338 may route messages based on the load or processing queue at the various PCRN blades. Various alternative methods of PCRN blade assignment and/or forwarding messages to appropriate PCRN blades will be apparent to those of skill in the art.

PCRN 136 may also include a plurality of PCRN blades 340, 350, 360. It should be noted that, while three PCRN blades 340, 350, 360 are illustrated, various embodiments may include fewer or more PCRN blades. Further, the number of PCRN blades 340, 350, 360 may change during operation of PCRN 136. For example, an administrator may remove PCRN blades that are faulty and/or may add new PCRN blades (not shown) to increase the capacity of PCRN 136.

Each PCRN blade 340, 350, 360 may include a complete implementation of a policy and charging rules function (PCRF) as defined by the 3GPP. Each PCRN blade 340, 350, 360 may be implemented on an independent circuit board and may include various hardware components such as processors, main memory, network and/or backplane interfaces, and/or data storage devices. Accordingly, each PCRN blade 340, 350, 360 may be adapted to perform various PCRF functions such as receiving request messages, processing request messages to create policy and charging control (PCC) rules, installing PCC rules at other nodes. In processing messages, it may be useful for a PCRN blade 340, 350, 360 to determine whether a received message is for a subscriber of the home network. Each PCRN blade 340, 350, 360 may include a home network identity module 345, 355, 365, respectively. The home network identity module 345, 355, 365 may be similar to home network identity module 335, but may include fewer network identifiers than home network identity module 335. As will be described in further detail below, a PCRN blade may use the home network identity module 335 to make decisions regarding processing a request message.

Figure 4:
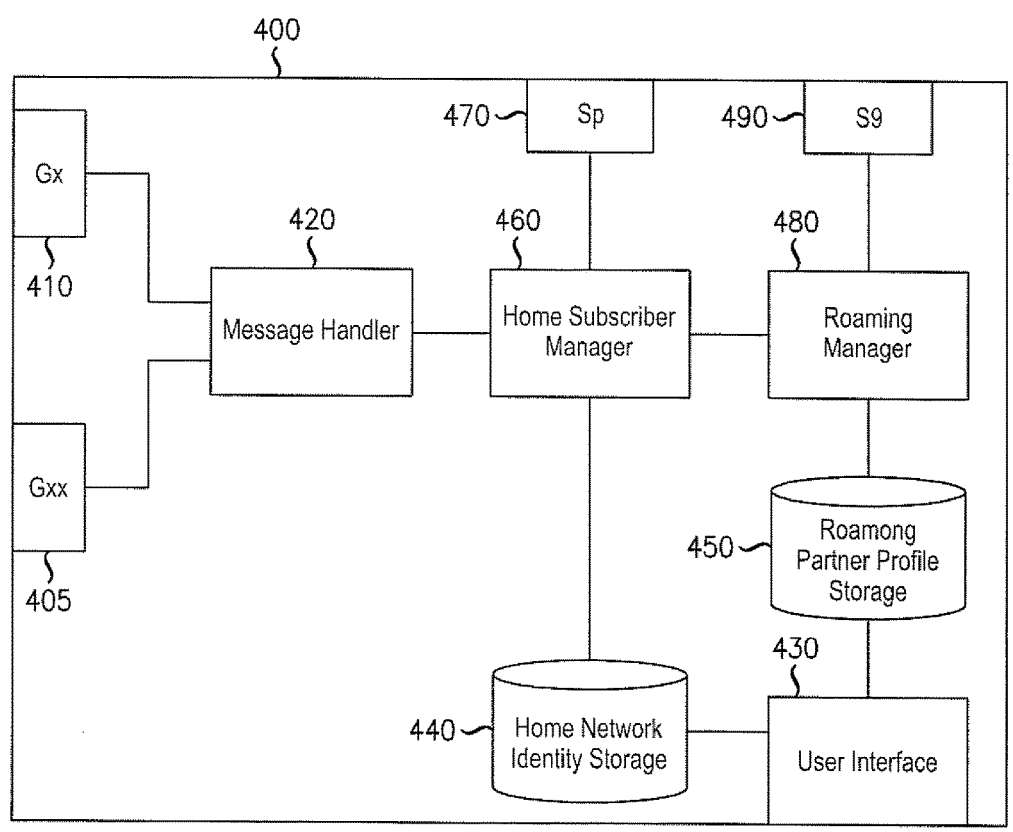
FIG. 4 illustrates an exemplary policy and charging rules node (PCRN)

FIG. 4 illustrates an exemplary policy and charging rules node (PCRN) 136. PCRN 136 may act as both a visited PCRN such as PCRN 236*v* and as a home PCRN such as PCRN 236*h*. PCRN 136 may include Gxx interface 405, Gx interface 410, message handler 420, user interface 430, home network identity 440, roaming partner profile storage 450, home subscriber manager 460, Sp interface 470, roaming manager 480, and S9 interface 490.

Gxx interface 405 may be an interface comprising hardware and/or executable instructions encoded on a machine-readable storage medium configured to communicate with a SGW such as SGW 232*v*. Such communication may be implemented according to the 3GPP TS 29.212. Thus, Gxx interface 405 may receive requests for QoS rules and transmit QoS rules for installation. Gxx interface 405 may further receive UE-originated application requests, session requests, and event notifications in the form of a credit control request (CCR).

Gx interface 410 may be an interface comprising hardware and/or executable instructions encoded on a machine-readable storage medium configured to communicate with a PGW such as PGW 234*v*. Such communication may be implemented according to the 3GPP TS 29.212. Thus, Gx interface 410 may receive requests for PCC rules and transmit PCC rules for installation. Gx interface 410 may further receive UE-originated application requests, session requests, and event notifications in the form of a CCR.

Message handler 420 may include hardware and/or executable instructions encoded on a machine-readable storage medium configured to process messages sent and/or received via Gxx interface 405 and/or Gx interface 410. Message handler 420 may extract information from the attribute value pairs (AVP) or other fields of received message. For example, message handler 420 may receive a rule request from PGW 134 for a subscriber and extract one or more subscription identifiers. After PCRN 136 makes a policy decision, message handler 420 may construct and transmit a message over Gxx interface 405 and/or Gx interface 410 to notify other nodes as to the result of the policy decision. For example, if PCRN 136 creates a new PCC rule according to an applicable policy, message handler 420 may construct a reauthorization request (RAR) message to push the new PCC rule to an appropriate PGW.

User interface 430 may include hardware and/or executable instructions encoded on a machine-readable storage medium configured to provide a network operator with access to PCRN 136. User interface 430 may receive input from a network operator and may include hardware such as, for example, a keyboard and/or mouse. User interface 430 may also display information as output to the network operator and may include, for example, a monitor. A network operator may access home network identity 440 via user interface 430. User interface 430 may provide a network operator with various options for creating the home network identity 440. A network operator may also configure roaming partner profile storage 450 via user interface 430.

Home network identity storage 440 may include any machine-readable medium capable of storing network identification information for use by PCRN 136. Accordingly, home network identity storage 440 may include a machine-readable storage medium such as read-only memory (ROM), random-access memory (RAM), magnetic disk storage media, optical storage media, flash-memory devices, and/or similar storage media. As will be described in further detail below with respect to FIG. 5, a home network identity in home network identity storage 440 may include one or more 3GPP network identifiers, NAI domain names, and/or emergency APNs. Home network identity storage 440 may be accessed whenever PCRN 136 receives a message in order to determine whether the message relates to a home network subscriber or an emergency APN. Thus, home network identity storage 440 may be considered part of home network identity modules 335, 345, 355, 365.

Roaming partner profile storage 450 may include any machine-readable medium capable of storing roaming partner profiles for use by PCRN 136. Accordingly, roaming partner profile storage 450 may include a machine-readable storage medium such as read-only memory (ROM), random-access memory (RAM), magnetic disk storage media, optical storage media, flash-memory devices, and/or similar storage media. As will be described in further detail below with respect to FIG. 6, roaming partner profile storage 450 may store numerous roaming partner profiles. Roaming partner profile storage 450 may include a cache for storing roaming partner profiles that are used frequently.

Home subscriber manager 460 may include hardware and/or executable instructions encoded on a machine-readable storage medium configured to process requests from home network subscribers. Thus, home subscriber manager 460 may be considered part of home network identity modules 335, 345, 355, 365. PCRN 136 may receive a request related to a home subscriber in the form of a CCR message received via Gx interface 405 or Gxx interface 410. PCRN 136 may also receive a request related to a home subscriber who is roaming on the network of a roaming partner via S9 interface 490. Upon receiving a request, home subscriber manager 460 may first determine whether the request relates to a home network subscriber. Home subscriber manager 460 may compare part of a subscription identifier with home network identity 450 to determine whether the message relates to a home network subscriber. Home subscriber manager 460 may treat any request from an emergency APN as if it relates to a home network subscriber. If a request does not relate to a home network subscriber, home subscriber manager may determine that the request is for a roaming subscriber and send the request to roaming manager 480.

Home subscriber manager 460 may also respond to request messages related to home network subscribers. Home subscriber manager 460 may use Sp interface 470 to obtain subscriber records from SPR 138. If a request is related to the home network, but a subscriber record cannot be found, home subscriber manager 460 may treat the request as an unidentified subscriber and fulfill the request using a default subscriber record. Home subscriber manager 460 may use information from the request message and the subscriber record to generate PCC/QoS rules. Then, home subscriber manager 460 may use message handler 420 to install the rules in the subscriber network.

Sp interface 470 may be an interface comprising hardware and/or executable instructions encoded on a machine-readable storage medium configured to communicate with an SPR such as SPR 138. Sp interface 470 may query SPR 138 with a subscription identifier. Sp interface 470 may receive a subscriber record from SPR 138. In various exemplary embodiments, Sp interface 470 may be a network interface and communicate with a remote SPR. In various alternative embodiments, the SPR may be a cache or local database within PCRN 136, and Sp interface 470 may query the local cache or database.

Roaming manager 480 may include hardware and/or executable instructions encoded on a machine-readable storage medium configured to process requests for service for a roaming subscriber. When acting as a visited PCRN, PCRN 136 may receive a request in the form of a CCR message received via Gx interface 405 or Gxx interface 410. Roaming manager 480 may receive the request after home subscriber manager 460 has determined that the request is not for a home network subscriber. Roaming manager 480 may determine whether the request is for a roaming subscriber whose HPLMN has made a contractual roaming agreement with the VPLMN. Accordingly, roaming manager 480 may compare the subscription identifier with various network identifiers stored in the roaming partner profile storage 450. Roaming manager 480 may use information stored in roaming partner profile storage 450 to establish a communication session with a home PCRN, such as PCRN 236h, of the roaming subscriber over S9 interface 490. Roaming manager 480 may forward any information included in the service request to the home PCRN via the S9 interface. A more detailed description of an exemplary method including steps performed by roaming manager 480 will be provided below with respect to FIG. 7.

Roaming manager 480 may also process requests from a roaming partner device when PCRN 136 acts as a home PCRN such as PCRN 236h. PCRN 136 may receive a request in the form of a CCR message from a visited PCRN 236v via S9 interface 490. Roaming manager 480 may determine whether the request is from a roaming partner who has made a contractual roaming agreement by comparing an origin realm of the received message with roaming partner profiles 450. If the request is from a roaming partner and the subscription identifier matches home network identity 440 of PCRN 236h, roaming manager 480 may pass the request to home subscriber manager 460 to generate PCC/QoS rules for the home network subscriber.

S9 interface 490 may be an interface comprising hardware and/or executable instructions encoded on a machine-readable storage medium configured to communicate with another PCRN. When PCRN 136 acts as a visited PCRN, S9 interface 490 may be used to establish an S9 session with a home PCRN such as PCRN 236h. When PCRN 136 acts as a home PCRN, S9 interface 490 may receive an S9 session request from a visited PCRN such as PCRN 236v. Such communication may be implemented according to the 3GPP TS 29.215. Thus, S9 interface 490 may forward requests for PCC/QoS rules to a partner device and receive PCC/QoS rules from a partner device for installation in the VPLMN. S9 interface 490 may include an S9 session for each roaming UE. The partner devices may use the established S9 session for monitoring and updating the subscriber's connection while the UE is attached to the VPLMN.

Figure 5:
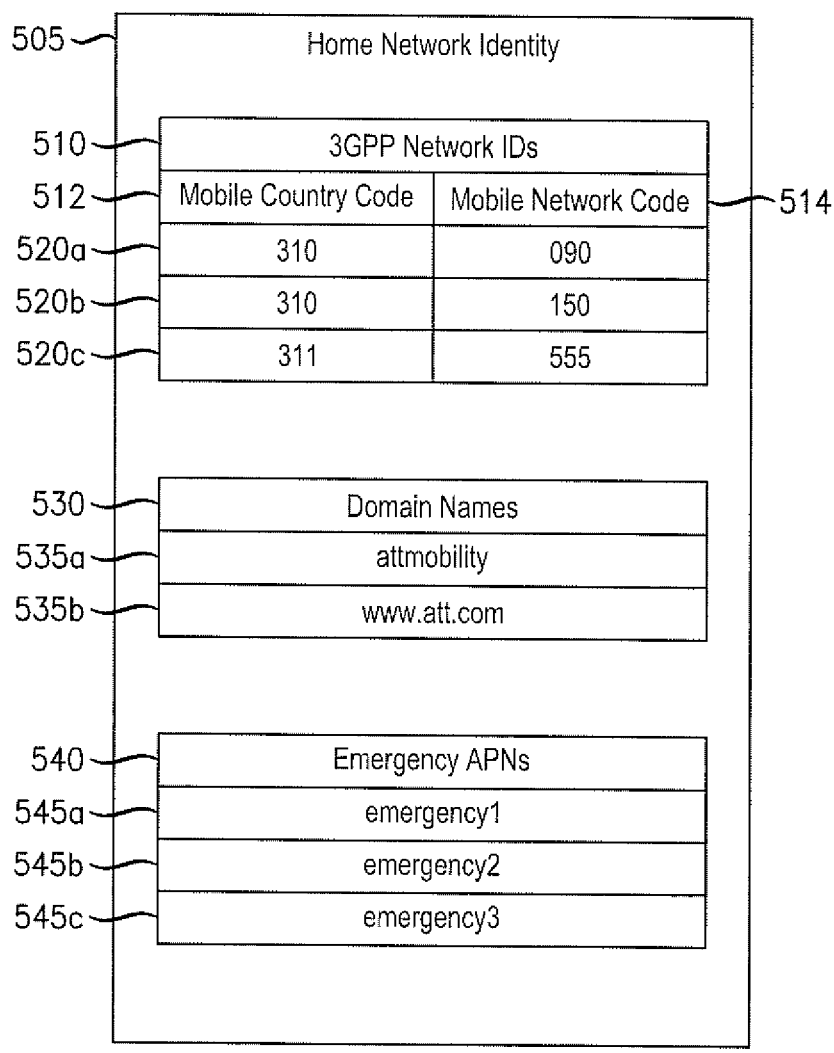
FIG. 5 illustrates an exemplary data structure for storing a home network identity.

FIG. 5 illustrates an exemplary data structure 500 for storing a home network identity 505. It should be apparent that data structure 500 may be implemented using a variety of data structures such as, for example, objects, arrays, linked lists, or trees. Data structure 500 may be stored in home network identity 440 or another computer-readable storage medium accessible to PCRN 136.

Exemplary home network identity 505 may be configured by a network operator using user interface 430 or may be imported from a computer-readable storage medium or other source. The home network identity 505 may vary between DPA 330 and PCRN blades 340, 350, 360. DPA 330 may include a complete home network identity including all network identifiers and emergency APNs included in the home network identity of the PCRN blades 340, 350, 360. Home network identity 505 may include multiple fields including a set of 3GPP Network IDs 510, set of domain names 530, and set of emergency APNs 540.

The set of 3GPP Network IDs 510 may include a set of network IDs used by the HPLMN. A 3GPP network ID may be part of an IMSI number used to identify a subscriber. A 3GPP network ID may include a Mobile Country Code (MCC) 512 and a Mobile Network Code WINO 514. A subscriber network may use multiple MCCs and multiple MNCs within the same country. The set of 3GPP Network IDs 510 may include entries 520. Each entry 520 may include a MCC/MNC pair. Exemplary home network identity 505 may include three entries 520*a*-*c*. Exemplary entry 520*a* may indicate the subscriber network uses an MCC/MNC combination "310/090". Exemplary entry 520*b* may indicate the subscriber network uses an MCC/MNC combination "310/150". Exemplary entry 520*c* may indicate the subscriber network uses an MCC/MNC combination "311/555". Additional entries 520 may be included for other MCC/MNC combinations.

The set of domain names 530 may include a set of domain names used by the HPLMN. A domain name may be used by the HPLMN as part of a Network Access Identifier used to identify a subscriber. The set of domain names 530 may include any domain name or variation of spelling used by the HPLMN. Exemplary home network identity 505 may include two entries 535*a* and 535*b*. Exemplary entry 535*a* may indicate that the HPLMN uses "attmobility" as a domain name. Exemplary entry 535*b* may indicate that the HPLMN uses "www.att.com" as a domain name. Additional entries 535 may be included for additional domain names and/or alternative spellings.

The set of emergency APNs 530 may include emergency APNs used for emergency purposes such as telephone calls for emergency services. PCRN 136 may treat any request involving an emergency APN as if it were from a home network subscriber. Thus, a roaming subscriber would be able to obtain emergency services even if the subscriber's network is not a roaming partner of the HPLMN. The set of APNs 530 may include entries 545 indicating the name of an emergency APN. Exemplary home network identity 500 may include three entries 545*a*-*c*. Entry 545*a* may indicate an APN named "emergency1" is an emergency APN. Entry 545*b* may indicate an APN named "emergency2" is an emergency APN. Entry 545*c* may indicate an APN name "emergency3" is an emergency APN.

Figure 6:
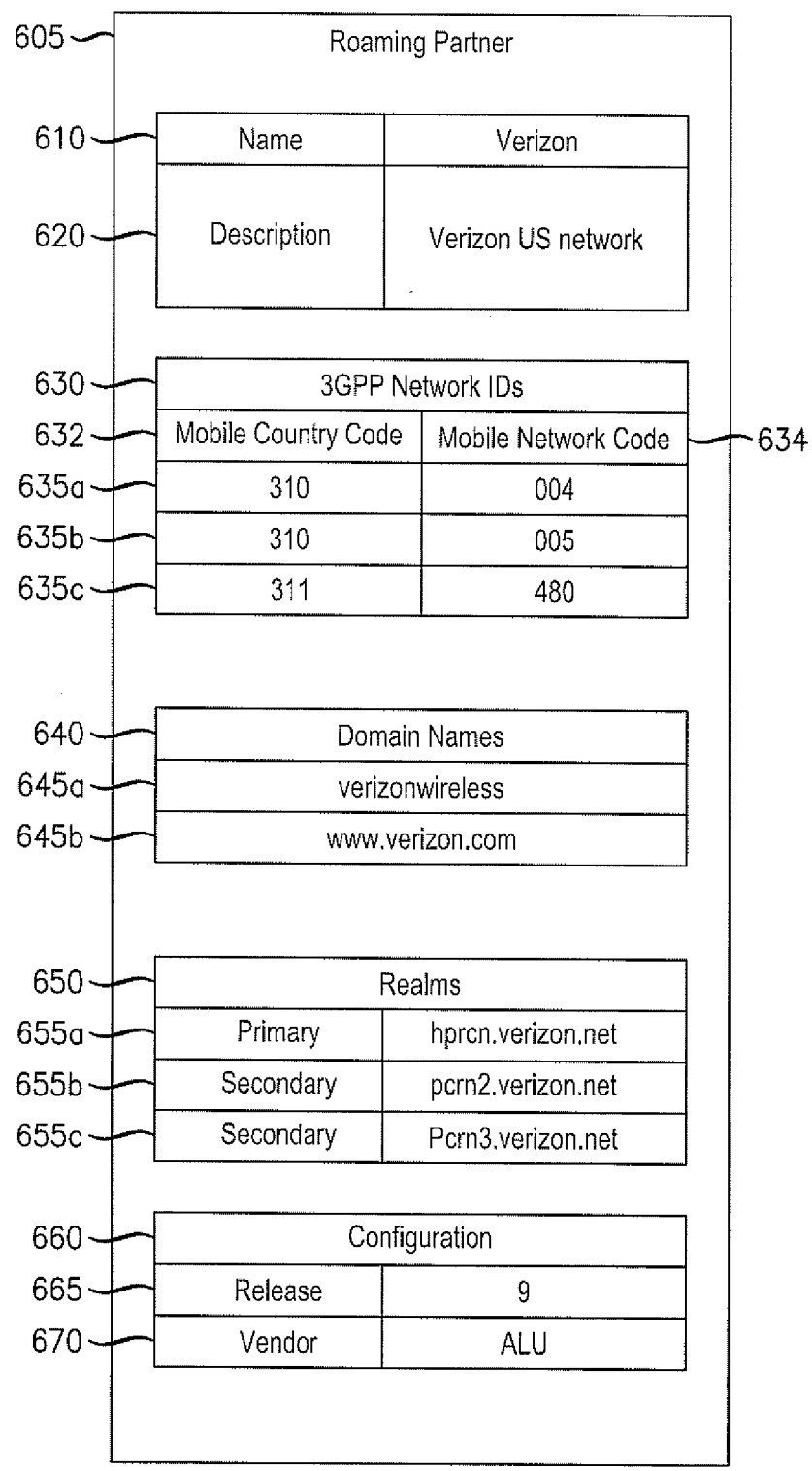
FIG. 6 illustrates an exemplary data structure for storing a roaming partner profile.

FIG. 6 illustrates an exemplary data structure 600 for storing information about an exemplary roaming partner profile 605. It should be apparent that data structure 600 may be implemented using a variety of data structures such as, for example, objects, arrays, linked lists, or trees. Data structure 600 may be stored in roaming partner profile storage 440 or another computer-readable storage medium accessible to PCRN 136.

Exemplary roaming partner profile 605 may be one possible roaming partner profile used by PCRN 136. Roaming partner profile 605 may be configured by a network operator using user interface 430 or may be imported from a computer-readable storage medium or other source. It should be apparent that PCRN 136 may use multiple roaming partner profiles. PCRN 136 may include one roaming partner profile for each other service provider that has made a roaming agreement with the operator of PCRN 136. Roaming partner profile 605 may include multiple fields including name 610, description 620, set of 3GPP Network IDs 630, set of domain names 640, set of realms 650, configuration information 660.

Name 610 may indicate a unique name for the roaming partner profile. Name 610 may be used to identify the particular roaming partner. Name 610 may be set by a network operator configuring the roaming partner profile. Exemplary roaming partner profile 605 may be named "Verizon" as indicated by name 610. Description 620 may include a textual description of the roaming partner. Description 620 may provide a network operator or other person viewing roaming partner profile 605 with an explanation of the roaming partner. For example, description 620 may indicate that exemplary roaming partner profile 605 is for Verizon's US network.

The set of 3GPP Network IDs 630 may include a set of network IDs used by the roaming partner. A 3GPP network ID may be part of an IMSI number used to identify a subscriber. A 3GPP network ID may include a Mobile Country Code (MCC) 632 and a Mobile Network Code (MNC) 634. A roaming partner may use multiple MCCs and multiple MNCs within the same country. The set of 3GPP Network IDs 630 may include entries 635. Each entry 635 may include a MCC/MNC pair. Exemplary roaming partner profile 605 may include three entries 635*a*-*c*. Exemplary entry 635*a* may indicate the roaming partner uses an MCC/MNC combination "310/004". Exemplary entry 635*b* may indicate the roaming partner uses an MCC/MNC combination "310/005". Exemplary entry 635*c* may indicate the roaming partner uses an MCC/MNC combination "311/480". Additional entries 635 may be included for other MCC/MNC combinations.

The set of domain names 640 may include a set of domain names used by the roaming partner. A domain name may be used by a roaming partner as part of a Network Access Identifier used to identify a subscriber. The set of domain names 640 may include any domain name or variation of spelling used by the roaming partner. Exemplary roaming partner profile 605 may include two entries 645*a* and 645*b*. Exemplary entry 645*a* may indicate that the roaming partner uses "verizonwireless" as a domain name. Exemplary entry 645*b* may indicate that the roaming partner uses "www.verizon.com" as a domain name. Additional entries 645 may be included for additional domain names and/or alternative spellings.

The set of realms 650 may include a set of realms used by the roaming partner. The realm may provide an address to be used for communicating with the roaming partner. A realm may be a fully qualified domain name (FQDN) that unambiguously designates a Diameter realm of the roaming partner. A realm may follow the naming convention described in 3GPP TS 23.003. For example, a realm may be designated "gan.mnc123.mcc310.3gppnetwork.org."

A realm may be a primary realm or a secondary realm. The primary realm may indicate a Diameter realm that the roaming partner has indicated should receive all requests for roaming subscribers. Routing information storage 450 may include routing information for sending messages to the primary realm. Each roaming partner profile 600 may include only a single primary realm.

Secondary realms may indicate the realm of a PCRN that may act as a visited PCRN and send requests to PCRN 136 when it acts as a home PCRN. The roaming partner profile 600 may include a secondary realm for each Diameter realm used to send messages from a roaming partner. If the roaming partner profile 600 does not include a secondary realm matching an origin realm of a received S9 request, PCRN 136 may reject the request.

Exemplary set of realms 650 may include exemplary entries 655*a-c*. Exemplary entry 655*a* may indicate that the roaming partner uses "hprcn.verizon.net" as the primary realm for receiving requests for roaming sessions. Exemplary entry 655*b* may indicate that the roaming partner uses "pcrn2.verizon.net" as a secondary realm. Exemplary entry 655*b* may indicate that the roaming partner uses "pcrn3.verizon.net" as a secondary realm.

Configuration information 660 may indicate other useful information about the roaming partner. For example, release 662 may indicate a specification version number that the roaming partner supports. This information may be used to ensure compatibility. As another example, vendor 664 may indicate a vendor of equipment such as the PCRN used by the roaming provider.

Figure 7:
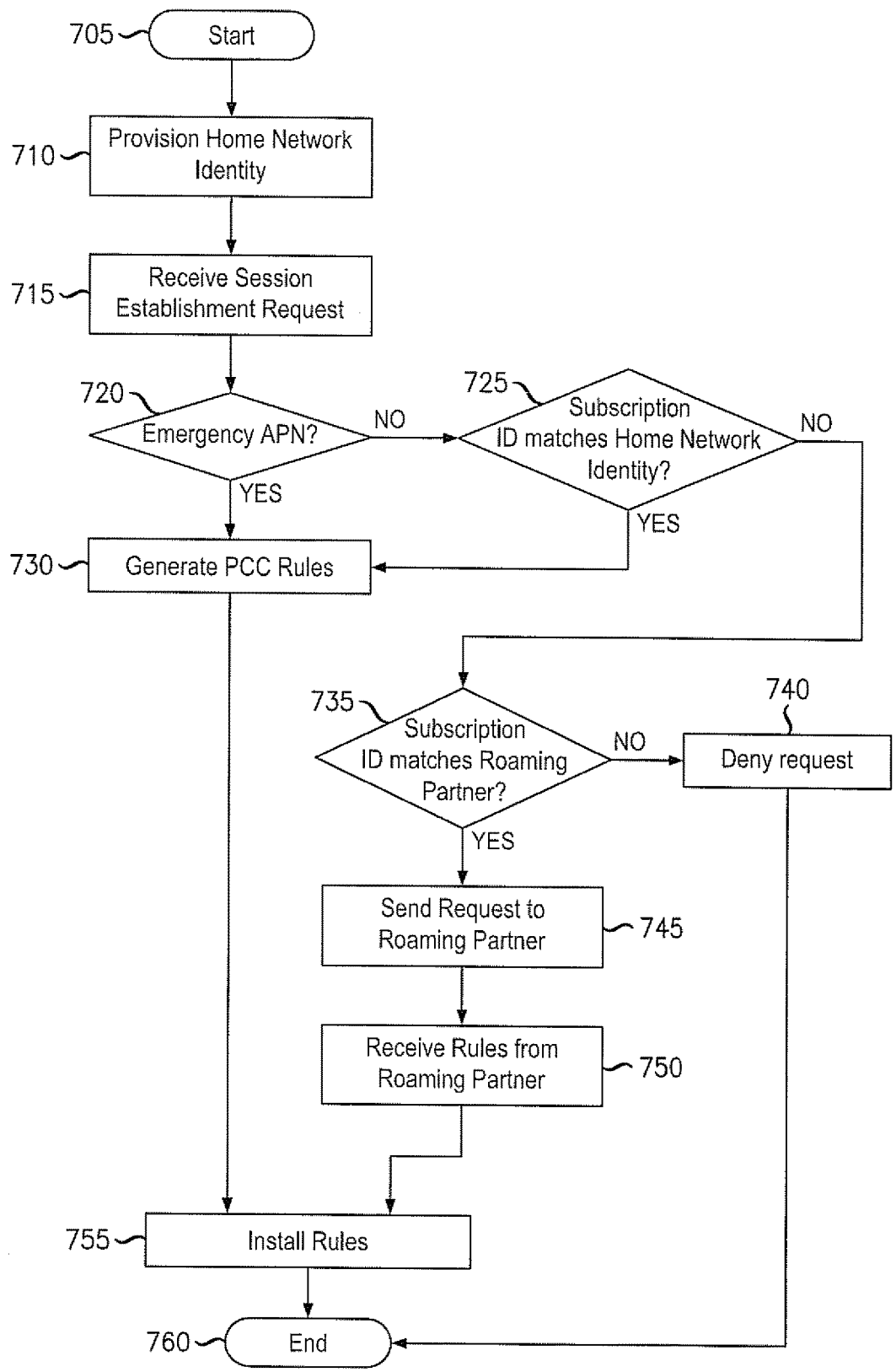
FIG. 7 illustrates a flowchart showing an exemplary method of processing a request from a subscriber.

FIG. 7 illustrates a flowchart showing an exemplary method of processing a request from a subscriber. Method 700 may be performed by the various components of PCRN 136 including: message handler 420, home subscriber manager 460, and roaming manager 480. Method 700 may begin at step 705 and proceed to step 710.

In step 710, PCRN 136 may provision home network identity 440. A network operator may use user interface 430 to configure home network identity 440. In particular, the network operator may configure network identifiers for the home network identity 440. The network identifiers may include MCC/MNC combinations and/or domain names. The network operator may also configure at least one emergency APN for home network identity 440. The method may then proceed to step 715.

In step 715 PCRN 136 may receive a session establishment request for a subscriber's UE 110 via Gxx interface 405 or Gx interface 410. The method may then proceed to step 720, where PCRN 136 may determine whether the session establishment request includes an emergency APN. PCRN 136 may compare an APN field such as a Called-Station-Id AVP within the session establishment request with the set of emergency APNs 540. If the APN field matches an emergency APN, the method may proceed to step 730. If the APN field does not match an emergency APN, the method may proceed to step 725.

In step 725, PCRN 136 may determine whether the session establishment request includes a network identifier matching the home network identity 540. PCRN 136 may extract a network identifier from a subscription identifier of the session establishment request. If the subscription identifier includes an IMSI, PCRN 136 may compare the first five or six digits of the IMSI to the set of 3GPP network IDs 510. If the subscription identifier includes an NAI, PCRN 136 may compare the domain name of the NAI with the set of domain names 530. If the network identifier of the session establishment request matches a network identifier of home network identity 540, the method may proceed to step 730. If the network identifier of the session establishment request does not match a network identifier of home network identity 540, the method may proceed to step 735.

In step 730, PCRN 136 may fulfill the session establishment request of the home network subscriber or the emergency request. PCRN 136 may retrieve a subscriber record from SPR 138 using the subscription identifier and Sp interface 470. PCRN 136 may generate PCC/QoS rules using information from the session establishment request and the subscriber record. The method may then proceed to step 755.

In step 735, PCRN 136 may determine whether the session establishment request relates to a roaming subscriber of a roaming partner. PCRN 136 may compare the network identifier portion of the subscriber identifier with the network identifiers of a roaming partner profile in roaming partner profile storage 550. As described above with regard to step 720, PCRN 136 may compare an IMSI with a 3GPP network identifier or compare an NAI with a network domain name. If PCRN 136 finds a matching roaming partner profile, the method 700 may proceed to step 745. If PCRN 136 is unable to find a matching roaming partner profile, the method 700 may proceed to step 740, where PCRN 136 may deny the session establishment request.

In step 745, PCRN 136 may forward the session establishment request to a roaming partner. PCRN 136 may use S9 interface 490 to communicate with a partner device of the roaming partner. The method 700 may then proceed to step 750, where PCRN 136 may receive one or more PCC/QoS rules from the partner device. PCRN 136 may validate the PCC/QoS rules to ensure that they may be installed in the visited network. The method may then proceed to step 755.

In step 755, PCRN 136 may use message handler 420 to install PCC/QoS rules in the subscriber network 100. Message handler 420 may forward PCC rules to PGW 134. If PCRN 136 generated or received only PCC rules, PCRN 136 may derive QoS rules from the PCC rules and forward the QoS rules to SGW 132. Installation of the PCC/QoS rules may provide the subscriber with the requested service. The method 700 may then proceed to step 760, where the method ends.

According to the foregoing, various exemplary embodiments provide for a network node and method to identify subscribers of the network. In particular, by providing a configurable home network identity at a network node, the network node may identify subscribers to the network based on various subscription identifiers.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of determining, by a policy and rules charging node (PCRN), whether a session establishment request is for a subscriber of a home network, the method comprising:
   defining a home network identity including a domain name used by the home network and at least one emergency access point name (APN);
   receiving a session establishment request;
   comparing a called station ID of the session establishment request with the at least one emergency APN of the home network identity;
   comparing a subscription ID of the session establishment request with the domain name;
   comparing the domain name of a network access identifier (NAI) with the domain name of the home network identity, wherein the NAI with the domain name identifies the subscriber; and
   when either the called station ID matches the at least one emergency APN or the subscription ID matches the domain name:
   determining that the subscriber is a subscriber of the home network; and
   fulfilling the session establishment request.

2. The method of claim 1, wherein the step of fulfilling the session establishment request comprises:
   determining an instance of the PCRN that should process the session establishment request; and
   forwarding the session establishment request to the instance of the PCRN.

3. The method of claim 1, further comprising:
   when the called station ID does not match the at least one emergency APN and the subscription ID does not match the domain name:
   determining whether the subscriber is a roaming subscriber on the home network; and
   when the subscriber is a roaming subscriber, forwarding the session establishment request to a PCRN of roaming partner.

4. The method of claim 3, wherein the session establishment request is received from the PCRN of the roaming partner via an S9 interface.

5. The method of claim 1, wherein the session establishment request is received from a policy charging and enforcement node (PCEN).

6. A system for determining a home network of a subscriber, the system comprising:
   a policy and charging rules node (PCRN) configured to process a session establishment request, the PCRN comprising:
   a home network identity storage including a domain name and at least one emergency access point name (APN);
   an interface configured to receive a message requesting service for the subscriber; and
   a home subscriber manager configured to compare a called station ID of the session establishment request with the at least one emergency APN of the home network identity, compare a subscription ID of the session establishment request with the domain name, compare the domain name of a network access identifier (NAI) with the domain name of the home network identity, wherein the NAI with the domain name identifies the subscriber, determine that the message is to be processed locally when a subscription identifier of the message matches the domain name or a called station identifier of the message matches the at least one emergency APN.

7. The system of claim 6, further comprising:
   a Diameter proxy agent configured to receive the session establishment request, determine whether a subscriber associated with the session establishment request is the subscriber of the home network, and forward the session establishment request to the PCRN.

8. The system of claim 7, wherein the Diameter proxy agent is further configured to choose the PCRN based on the home network identity storage of the PCRN including the domain name or the at least one emergency APN included in the session establishment request.

9. The system of claim 6, further comprising:
   a partner PCRN configured to send the session establishment request via an S9 interface, wherein the PCRN is configured to receive the session establishment request from the partner PCRN via the S9 interface.

10. The system of claim 6, wherein the PCRN further comprises:
    a roaming manager configured to determine that the message is associated with a roaming subscriber when the subscription identifier matches a domain name of a roaming partner profile.

11. A tangible and non-transitory machine-readable storage medium encoded with instructions thereon for execution by a network element of a telecommunication network, wherein said tangible and non-transitory machine-readable storage medium comprises:
    instructions for defining a home network identity including a domain name used by a home network and at least one emergency access point name (APN);
    instructions for receiving a session establishment request;
    instructions for comparing a called station ID of the session establishment request with the at least one emergency APN of the home network identity;
    instructions for comparing a subscription ID of the session establishment request with the domain name;
    instructions for comparing the domain name of a network access identifier (NAI) with the domain name of the home network identity, wherein the NAI with the domain name identifies the subscriber;
    instructions for determining that the subscriber is a subscriber of the home network; and instructions for fulfilling the session establishment request when either the called station ID matches the at least one emergency APN or the subscription ID matches the domain name.

12. The tangible and non-transitory machine-readable storage medium of claim 11, wherein the instructions for fulfilling the session establishment request comprise:
   instructions for determining an instance of the PCRN that should process the session establishment request; and
   instructions for forwarding the session establishment request to the instance of the PCRN.

13. The tangible and non-transitory machine-readable storage medium of claim 11, further comprising:
   instructions for determining that the subscriber is a roaming subscriber on the home network when the called station ID does not match the at least one emergency APN and the subscription ID does not match the domain name; and
   instructions for forwarding the session establishment request to a PCRN of a roaming partner when the subscriber is a roaming subscriber.

14. The tangible and non-transitory machine-readable storage medium of claim 13, wherein the session establishment request is received from the PCRN of the roaming partner via an S9 interface.

15. The tangible and non-transitory machine-readable storage medium of claim 11, wherein the session establishment request is received from a policy charging and enforcement node (PCEN).

* * * * *